United States Patent [19]
Riser et al.

[11] Patent Number: 6,070,985
[45] Date of Patent: Jun. 6, 2000

[54] MULTIPORT ILLUMINATOR FOR LIGHT GUIDES

[75] Inventors: Andrew P. Riser, Capistrano Beach; Ronald F. Mathis, Ramona; David H. Liu, Rowland Heights, all of Calif.

[73] Assignee: Remote Source Lighting International, Inc., San Juan Capistrano, Calif.

[21] Appl. No.: 08/886,823

[22] Filed: Mar. 4, 1997

Related U.S. Application Data

[60] Provisional application No. 60/031,641, Nov. 22, 1996.

[51] Int. Cl.[7] ........................................... F21V 7/04
[52] U.S. Cl. ............................................. 362/32; 313/637
[58] Field of Search ........................ 362/552, 556, 362/560, 554, 580, 583; 385/116, 119

[56] References Cited

U.S. PATENT DOCUMENTS

| | | | |
|---|---|---|---|
| 4,050,784 | 9/1977 | Kobayashi | 385/34 X |
| 4,389,698 | 6/1983 | Cibie | 362/32 |
| 4,704,660 | 11/1987 | Robbins | 362/32 |
| 4,727,380 | 2/1988 | Miura et al. | |
| 4,811,171 | 3/1989 | Viola | 362/32 |
| 4,811,172 | 3/1989 | Davenport et al. | 362/61 |
| 4,816,975 | 3/1989 | Bahnemann et al. | 362/308 |
| 4,851,969 | 7/1989 | Davenport et al. | 362/61 X |
| 4,868,718 | 9/1989 | Davenport et al. | 362/32 |
| 4,912,605 | 3/1990 | Whitehead | 362/32 |
| 4,949,227 | 8/1990 | Finch et al. | 362/61 |
| 4,958,263 | 9/1990 | Davenport et al. | 362/32 |
| 4,961,622 | 10/1990 | Gorman et al. | 385/33 X |
| 5,222,793 | 6/1993 | Davenport | 362/32 |
| 5,259,056 | 11/1993 | Davenport et al. | 385/115 |
| 5,367,590 | 11/1994 | Davenport et al. | 385/901 X |
| 5,377,287 | 12/1994 | Lee et al. | 385/31 |
| 5,390,265 | 2/1995 | Jiao | |
| 5,396,571 | 3/1995 | Saadatmanesh et al. | 385/33 |
| 5,416,669 | 5/1995 | Kato et al. | |
| 5,469,337 | 11/1995 | Cassarly et al. | 362/32 |
| 5,610,763 | 3/1997 | Kudo | 359/619 |
| 5,668,441 | 9/1997 | Genz | 313/637 |

FOREIGN PATENT DOCUMENTS

| | | | |
|---|---|---|---|
| 2623231 | 12/1977 | Germany. | |
| 2651283 | 5/1978 | Germany | 362/32 X |
| 4309389 | 9/1993 | Germany. | |
| 63291012 | 11/1988 | Japan | 385/33 |
| 6174963 | 6/1994 | Japan | 385/24 |
| 2098311 | 11/1982 | United Kingdom | 385/901 X |
| 9009607 | 8/1990 | WIPO. | |

*Primary Examiner*—Nimeshkumar D. Patel
*Assistant Examiner*—Todd Reed Hopper
*Attorney, Agent, or Firm*—Stout, Uxa, Buyan & Mullins, LLP; Donald E. Stout

[57] ABSTRACT

A light guide illumination system having a metal-halide double-ended illumination source is disclosed. The light guide illumination system includes at least one light guide and two curved reflectors disposed in proximity to the double-ended illumination source. The two curved reflectors are adapted to reflect the emitted light from the double-ended illumination source into the light guide. The light guide illumination system further includes at least one multi-sectored lens adapted to receive light from the light guide, and at least one output light guide. The multi-sectored lens is adapted to receive the reflected light from the light guide and to focus the light into the output light guide.

19 Claims, 14 Drawing Sheets

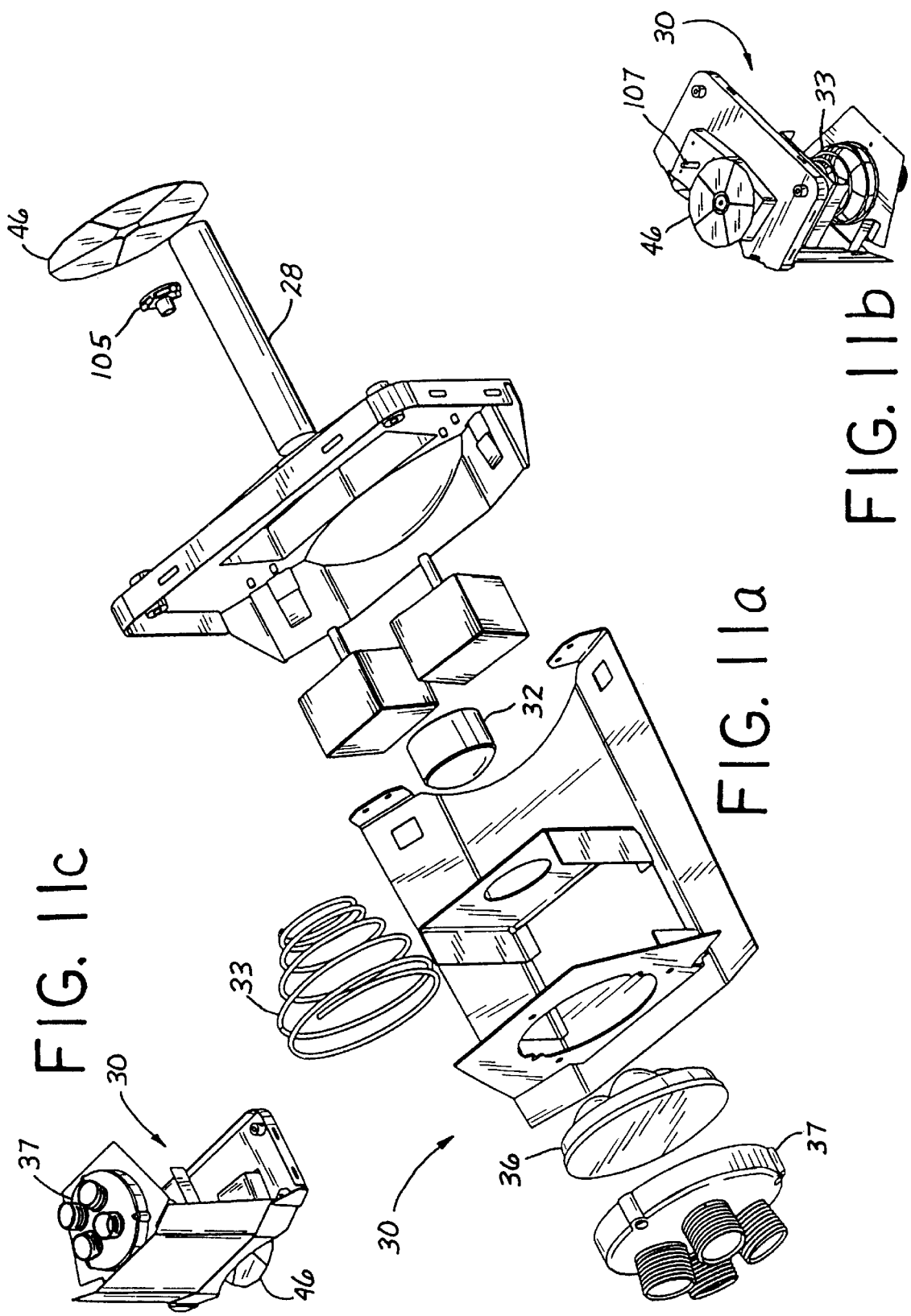

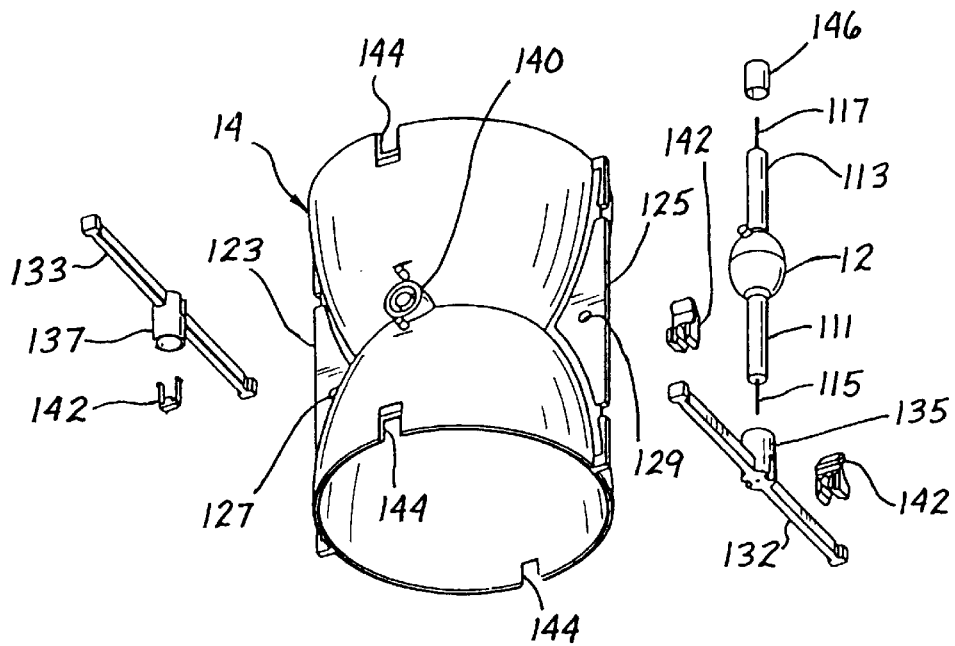
FIG. 12a
FIG. 12b
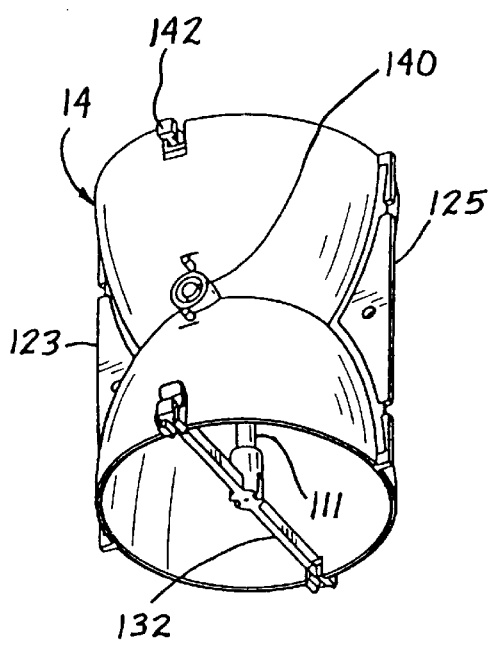
FIG. 12c
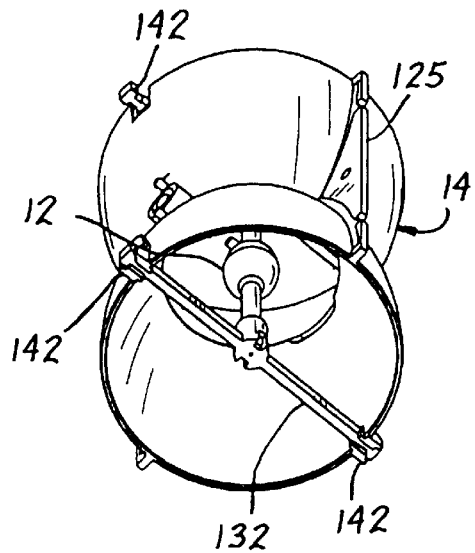

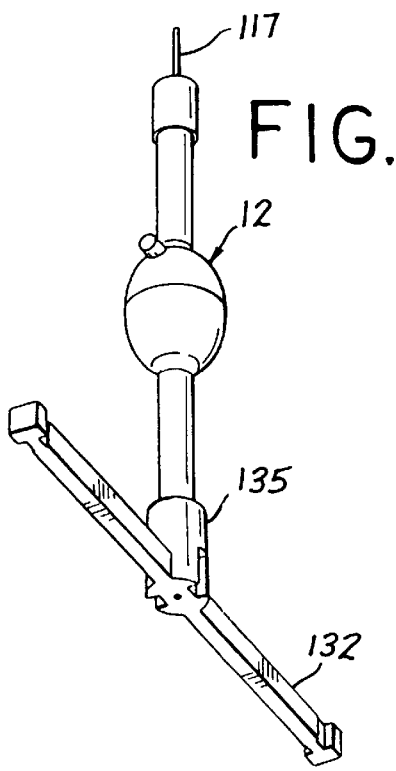
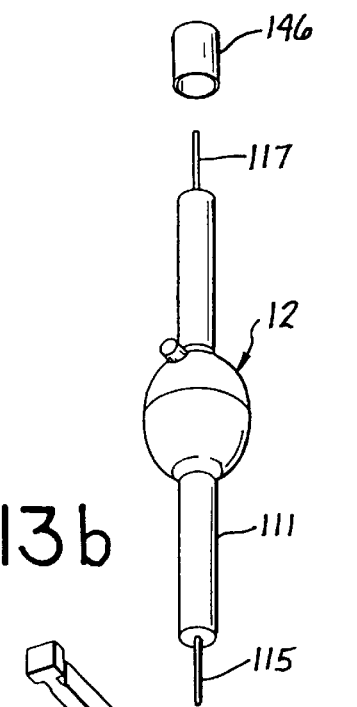
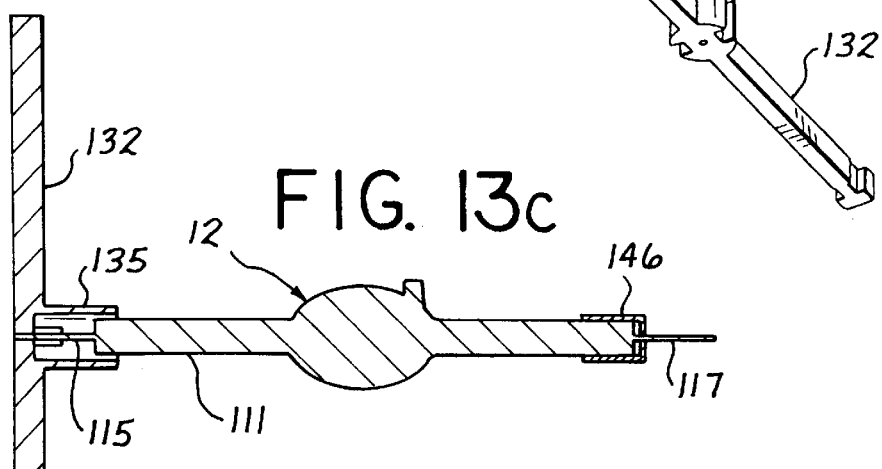
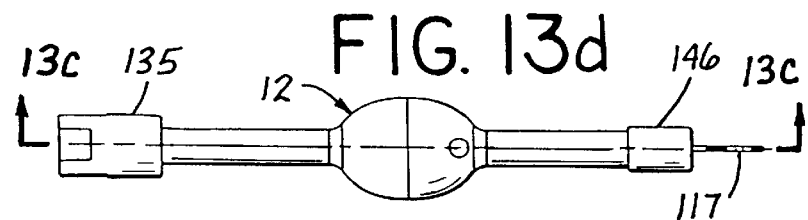

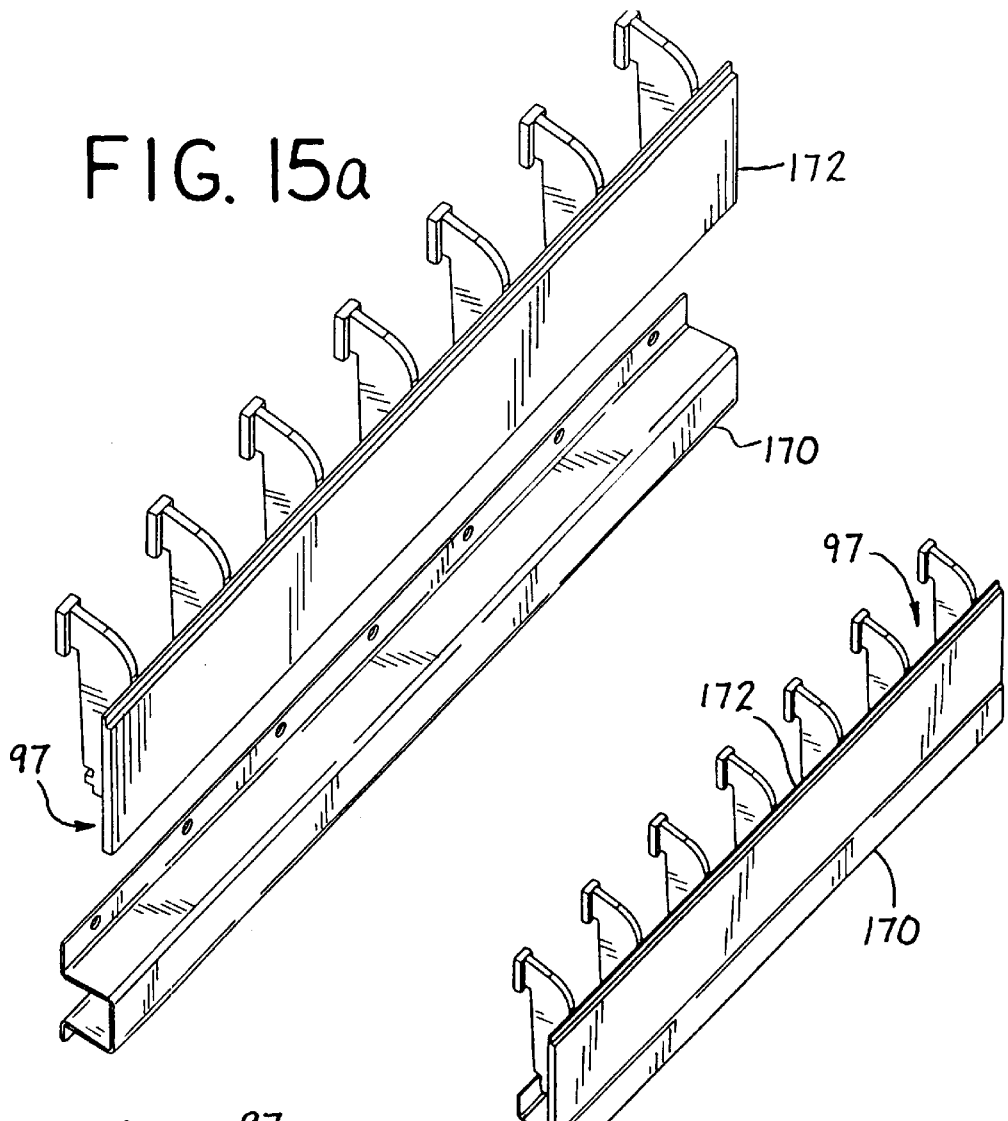
FIG. 15a
FIG. 15c
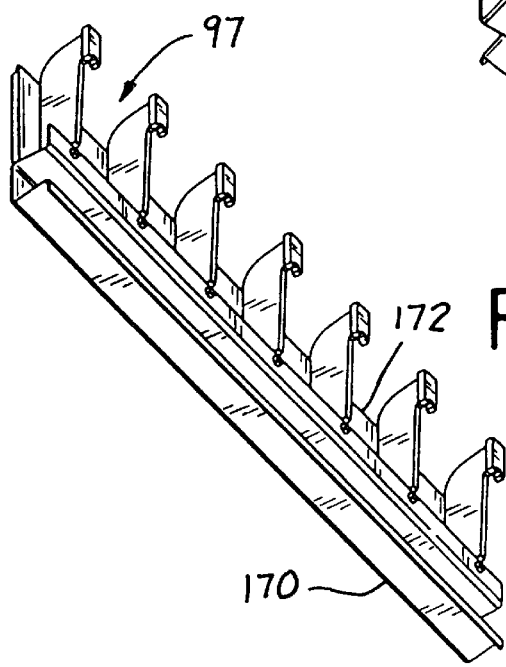
FIG. 15b

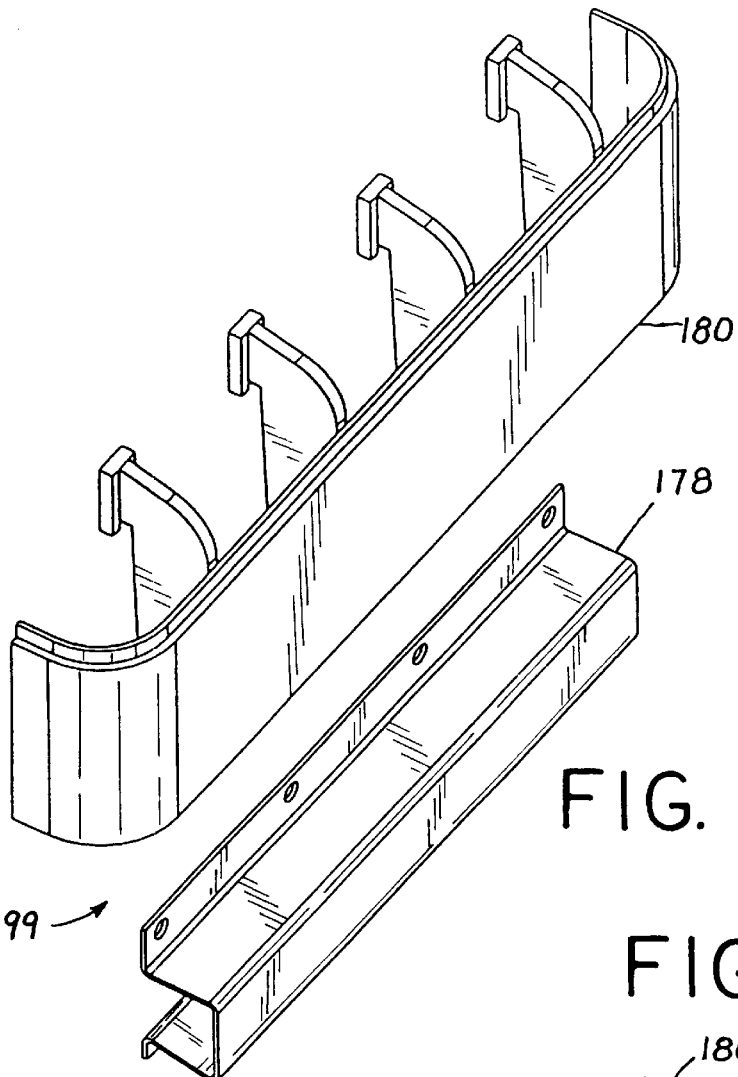
FIG. 16a
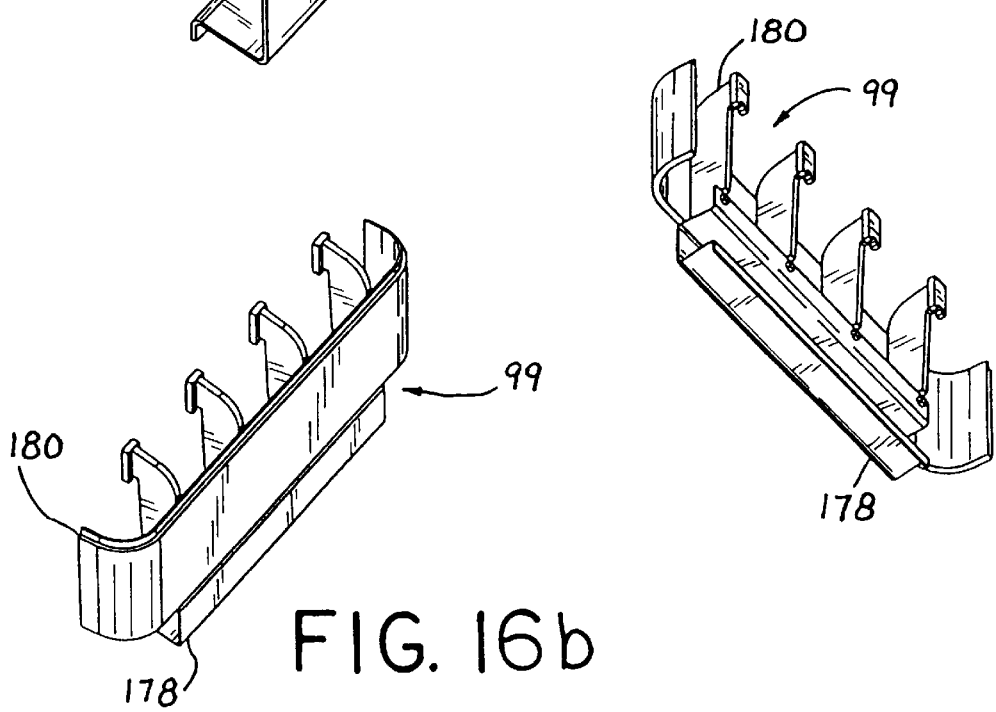
FIG. 16c
FIG. 16b

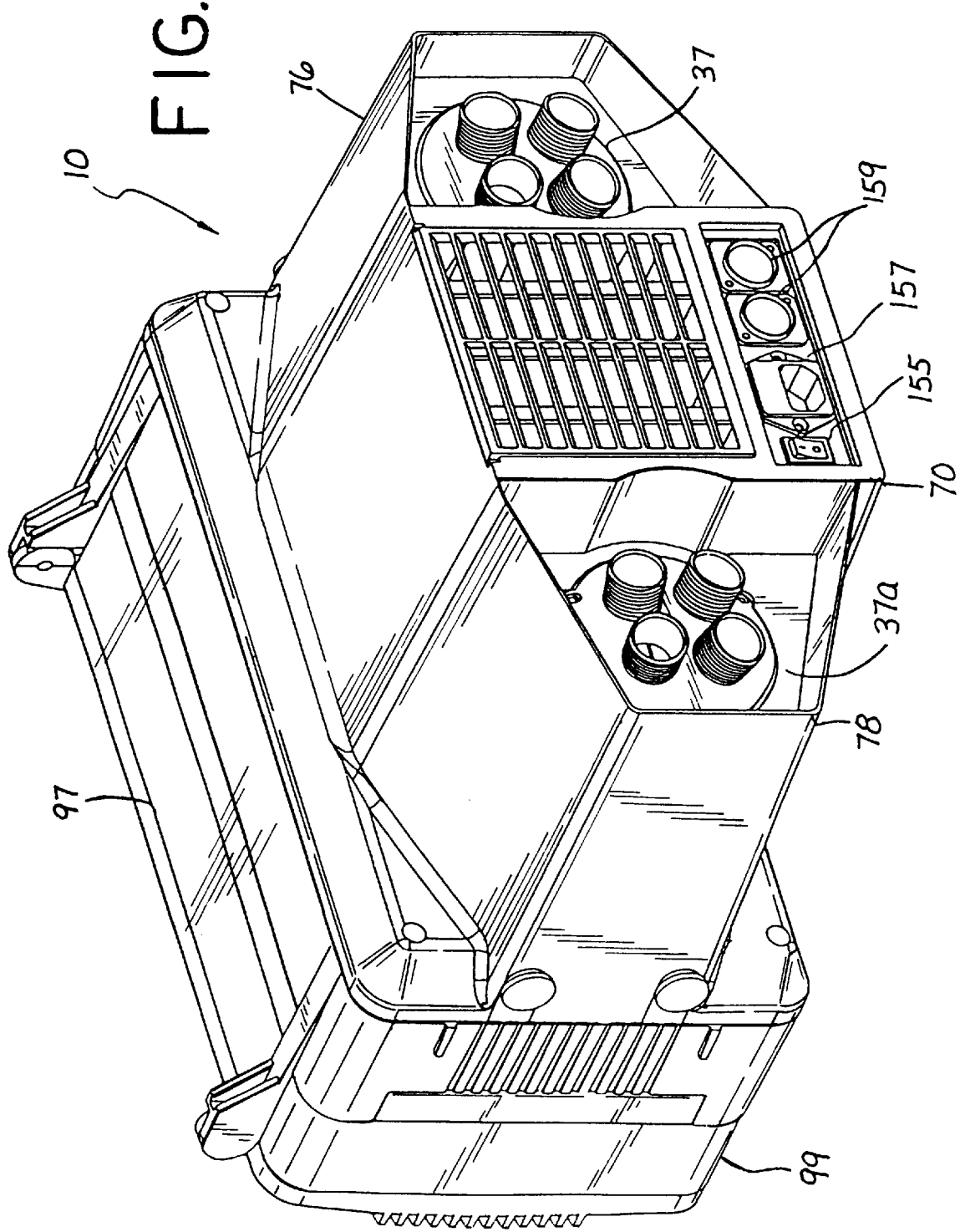

MULTIPORT ILLUMINATOR FOR LIGHT GUIDES

This application claims the benefit under 35 U.S.C. § 119(e) of U.S. Provisional Application Ser. No. 60/031,641, filed Nov. 22, 1996, This application is related to U.S. application Ser. No. 08/459,613 filed on Jun. 2, 1995 and entitled MULTIPORT ILLUMINATOR FOR MACRO-FIBERS, and now U.S. Pat. No. 5,706,376; U.S. application Ser. No. 08/599,970 filed on Feb. 14, 1996 and entitled OPTICAL COUPLER, and U.S. Pat. No. 5,857,041; U.S. application Ser. No. 08/645,324, filed on May 13, 1996 and entitled MULTIPORT ILLUMINATOR OPTIC DESIGN FOR MACRO-FIBERS, and now U.S. Pat. No. 5,790,723; U.S. application Ser. No. 08/645,325, filed on May 13, 1996 and entitled MULTIPORT ILLUMINATOR MECHANICAL DESIGN FOR MACRO-FIBERS, and now U.S. Pat. No. 5,708,737; U.S. application Ser. No. 08/645,326, filed on May 13, 1996 and entitled REFLECTOR FOR ILLUMINATION SYSTEM, and now U.S. Pat. No. 5,661,828; U.S. application Ser. No. 08/645,327, filed on May 13, 1996 and entitled REFLECTOR AND ILLUMINATION SYSTEM, and U.S. Pat. No. 5,682,448; U.S. application Ser. No. 08/743,426, filed on Nov. 1, 1996 and entitled MULTIPORT ILLUMINATOR FOR MACRO-FIBERS, and now U.S. Pat. No. 5,790,725; and U.S. application Ser. No. 08/742,846, filed on Nov. 1, 1996 and entitled REFLECTOR AND ILLUMINATION SYSTEM, and now U.S. Pat. No. 5,832,151; and U.S. application Ser. No. 08/886,822, filed on Mar. 4, 1997 and entitled REFLECTOR AND ILLUMINATION SYSTEM. All of the foregoing patents are commonly assigned and are hereby expressly incorporated by reference.

BACKGROUND OF THE INVENTION

1. Field of the Invention

The present invention relates generally to reflectors and, more particularly, to reflectors for coupling light from a light source into one or more light guides.

2. Description of Related Art

Large diameter fiber optics, often referred to as "flexible light guides", are well known in the art, and typically comprise a single, solid core light guide which is surrounded by a cladding layer and a sheath or shielding layer. The core is the portion of a light guide which transmits light, and typically has a diameter of about 2 to 12 mm. It is formed of a very soft, semi-liquid plastic material, such as OPTIFLEX®, which is manufactured by Rohm & Haas Corporation, of Philadelphia, Pa. The cladding layer typically comprises polytetrafluoroethylene (PTFE or TEFLON®), or the like, while the outer sheath is fabricated of a material such as polyvinylchloride (PVC). Unlike small diameter light guides, which are typically used to transmit information in relatively complex control systems, these large diameter "light guides" are typically employed in a variety of illumination systems where direct lighting is difficult to maintain, dangerous, or subject to vandalism. Examples include architectural lighting, display cases, pools and spas (to eliminate electrical connections near water), hazardous material zones (to eliminate the need for sealed lighting), and jail cells. Large diameter light guides are particularly advantageous in that only a single centralized illumination system must be maintained, rather than a plurality of individual lights.

There are problems, however, in implementing state of the art light guide illumination systems because of the difficulty of illuminating a plurality of light guides from a single illumination source, as is discussed in U.S. Pat. No. 5,559,911, which is expressly incorporated by reference herein. According to one prior art configuration, the light guides are bundled as closely as possible, to ensure the maximum ratio of core area (the part of each light guide which actually transmits light) to total area. However, bundling the large diameter light guides together in order to illuminate them from the single illumination source is difficult to do efficiently. The individual light guides are round and thus have a great deal of space between them due to the cladding and shielding layers. To obtain maximum efficiency, it is desirable to illuminate only the core of each of the bundled light guides, but this is impossible using state of the art bundling techniques. Necessarily, if the light from the source of illumination is spread across the array of light guides, it will illuminate not only the cores of the light guides, but also the cladding layers and shielding layers. Furthermore, the voids between the light guides, which are inevitable because of the light guides' round dimensions, also are impacted by the light from the illumination source. All of the light falling upon any element other than the cores is wasted, and becomes an efficiency loss, since it will not be transmitted by the light guides. Additionally, packing the light guides closely together may create problems such as mechanical difficulties in configuring and accommodating the illumination system and difficulties encountered in attempting to replace one of the individual bundled light guides. This design also may result in color variation between light guides unless techniques are specifically employed to prevent this problem.

One prior art solution to this problem has been to eliminate the sheathing and cladding layers about each light guide, in order to reduce the area across the bundled array of light guides which does not transmit light. However, there is still a packing factor problem because the light guides are round, and there are other physical disadvantages in eliminating those layers. Thus, this solution is unsatisfactory for most applications.

A number of prior art approaches use reflectors for focussing light from a source of illumination into one or more light guides. U.S. Pat. No. 5,222,793 and U.S. Pat. No. 5,259,056, both to Davenport et al., disclose lighting systems which use a single reflector assembly for illuminating light transmissive elements. U.S. Pat. No. 5,396,571 to Saadatmanesh et al. discloses a multi-segmented lens which divides light from a light beam into four separate beams, each of which is focussed onto a separate optical fiber. U.S. Pat. No. 4,912,605 to Whitehead discloses an electric light source mounted between two reflectors, each of which directs light into a corresponding light guide. U.S. Pat. No. 5,469,337 to Cassarly et al. discloses a light source and a plurality of curved reflectors for focussing light into lenses and then into a plurality of light guides. The use of reflectors and multi-segmented lenses by the prior art for coupling light into light guides has represented some advancement over the prior art bundled light guides, but the need for a proper and efficient coupling of a light source to a plurality of light guides still remains.

Another problem associated with prior art designs is the large number of optical components associated with these designs. Reducing the number of parts of any optical design would appear to be advantageous to any system.

SUMMARY OF THE INVENTION

This invention efficiently couples the light originating from an arc lamp, or similar source, into a multiplicity of flexible macroscopic light guides. Such a system is to be used in transmitting illumination from a central source to a variety of remote locations. The combination of the several elements of the inventive system results in a very efficient transfer of the energy of the light source to the light guides. The system also provides a very flexible mechanical means for distributing the energy to the light guides and to the remote locations at which the light is used.

The invention, together with additional features and advantages thereof may best be understood by reference to the following description taken in conjunction with the accompanying illustrative drawings.

BRIEF DESCRIPTION OF THE DRAWINGS

FIG. 11a illustrates an exploded view of the optical assembly of a side module, according to the presently preferred embodiment;

FIGS. 11b and 11c illustrate perspective views of the optical assembly shown in FIG. 11a;

FIG. 12a illustrates a partially disassembled view of the dual curved reflector and the light source, according to the presently preferred embodiment;

FIGS. 12b and 12c illustrate perspective views of the dual curved reflector and the light source, according to the presently preferred embodiment;

FIGS. 13a–13d illustrate various views of the light source, according to the presently preferred embodiment;

FIGS. 15a–15c illustrate various perspective views of the front and rear shields, according to the presently preferred embodiment;

FIGS. 16a–16c illustrate various views of the left and right shields, according to the presently preferred embodiment; and FIGS. 17a and 17b illustrate perspective views of the light guide illumination unit in an assembled configuration, according to the presently preferred embodiment.

DESCRIPTION OF THE PREFERRED EMBODIMENT

Figure 1A:
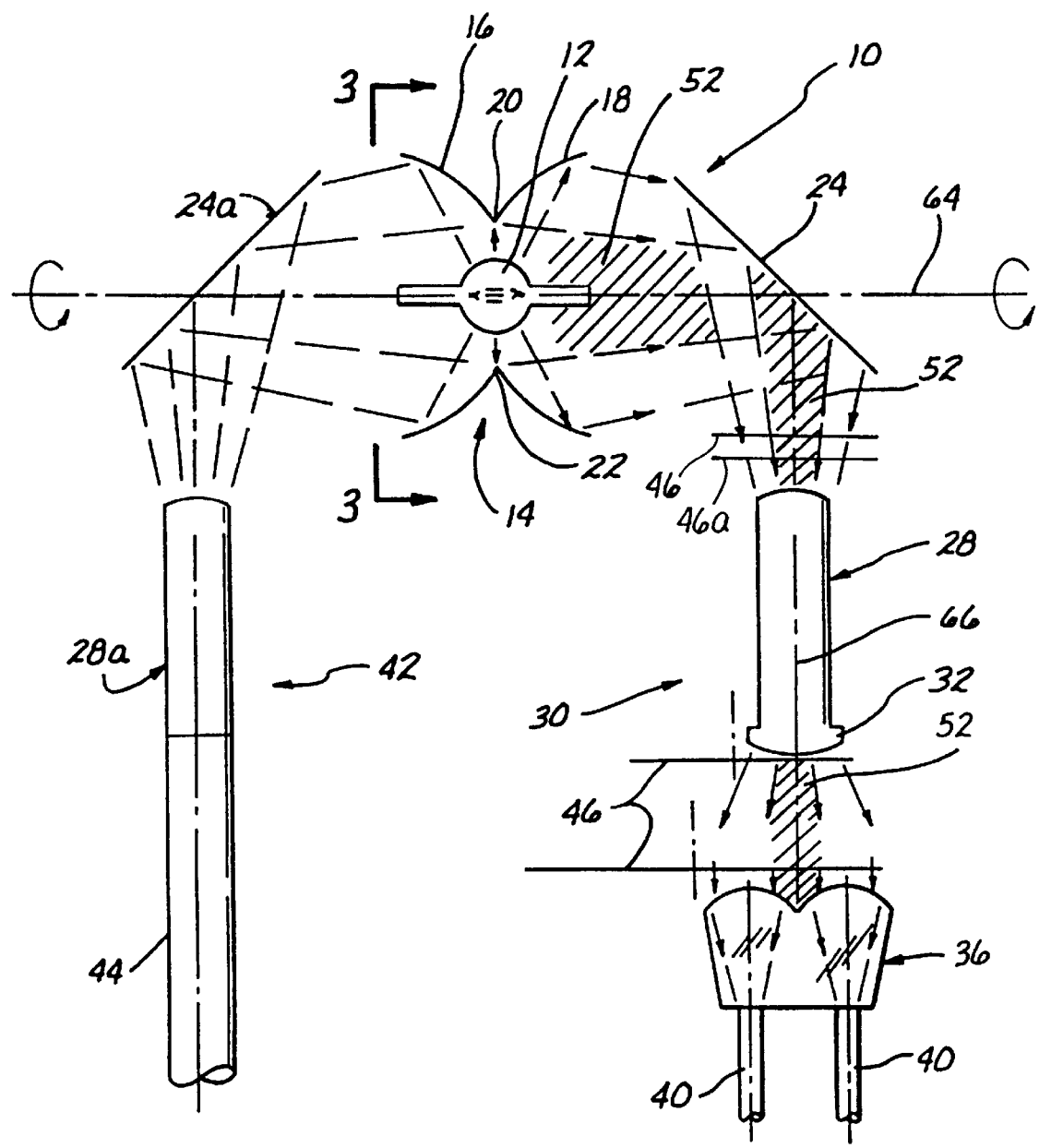
FIGS. 1a and 1b are schematic top views of optical systems according to the present invention.

Turning to FIG. 1a, an optical system 10 is illustrated which includes a compact light source 12, which may comprise an arc lamp or any other conventional means for emitting light. This light source 12 is placed at the focus of a dual curved reflector 14, which comprises two reflector portions 16 and 18 which are disposed in a back-to-back fashion. In each reflector portion 16, 18, the center or vertex region of the reflector has been removed, as illustrated, and the two reflector portions are joined at intersection points 20 and 22.

Figure 1B:
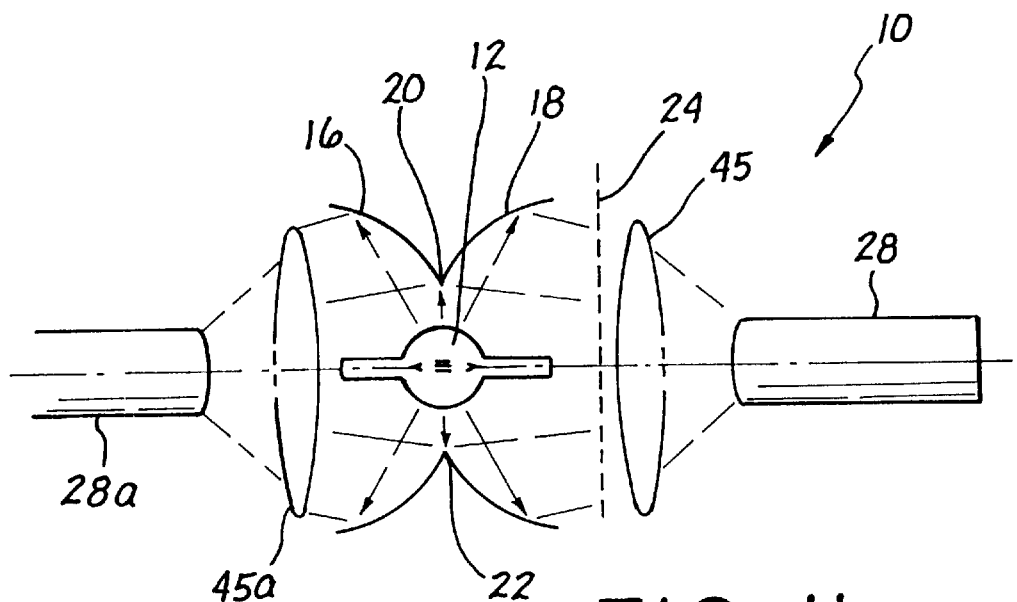

Light emitted from the light source 12 is reflected by the dual reflector 14, as illustrated by the lines of incidence shown in FIG. 1a, in two opposing directions, and is then directed through an angle of approximately 90 degrees (or any other desired angle) by each of two flat reflectors or fold mirrors 24 and 24a, respectively. The fold mirrors function to reflect heat generated by the light source 12, and to re-direct the light emitted from light source 12 to output light guides 40. Alternatively, particularly in a linear system using a dual reflector, as illustrated in FIG. 1b, ultra-violet (UV) and/or infrared (IR) radiation blocking coatings may be placed on the exit lens faces 32, since the fold mirrors 24 and 24a are not used, or hot mirrors 24' may be used for reflecting UV and IR radiation. The hot mirrors 24' may be placed at any stage between the light source and the output light guides and, further, may be placed at perpendicular or off-axis orientations.

Each focussed beam of light impinges on a respective one of the circular mixing rods 28, 28a. Although each mixing rod preferably comprises a circular cross-section, other cross-sections, such as rectangular, for example, may also be used. Each of the two circular light pipes 28, 28a preferably comprises a transparent material, such as glass or clear plastic, and is adapted to integrate the light beam by means of multiple reflections within the mixing rod. The mixing rods may be omitted in alternative embodiments of the present invention.

Figure 4:
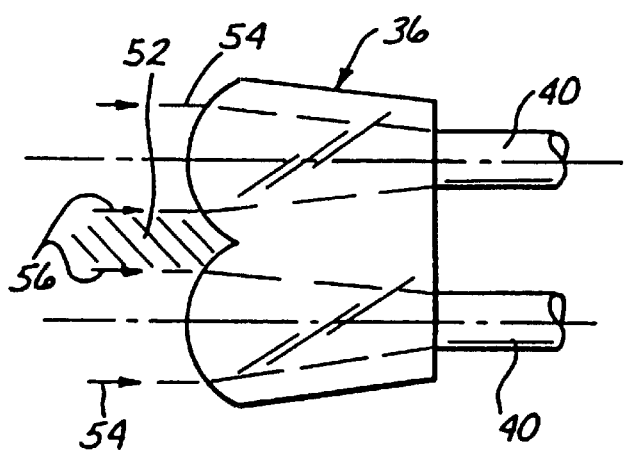
FIG. 4 is schematic side view illustrating the multi-sector lens which forms a part of the optical system shown in FIG. 1.
Figure 5:
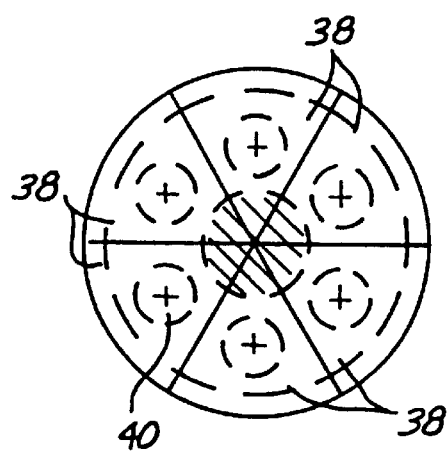
FIG. 5 is an end view of the multi-sector lens shown in FIG. 4.

On the right side of the system, or right channel 30, as illustrated in FIG. 1a, the light beam emerges from the mixing rod 28 at the exit lens face 32. The diverging beam from the mixing rod 28 is then focussed and split into a number of separate focussed beams by means of a multi-sector lens 36 (FIGS. 1a, 4, and 5). Each of the lens sectors 38 (FIG. 5) focusses onto the core of a corresponding output light guide 40. If an electrodeless lamp or a very high lumen output lamp is to be used, the light guides preferably comprise light guides which are rated for the proper lumen output. For high-lumen output cases, the light guides will often comprise a non-plastic material.

In a conventional optical design, a focussing lens would likely be required between the circular mixing rod 28 and the multi-sectored lens 36. The multi-sectored lens 36 of the present invention, however, is modified over conventional lenses to obviate any need for a focussing lens. For example, the multi-sectored lens 36 is larger than would be required with a conventional focussing lens between the multi-sectored lens 36 and the circular mixing rod 28. Alternatively, a conventional focussing lens may be used with the multi-sectioned lens 36.

The optical system for the left beam of FIG. 1a focussed by the dual reflector 14 through the left channel 42 can be essentially the same as that described with respect to the right channel 30, or some different features may be incorporated into the left channel. For example, the right channel 30 may have a sector lens accommodating ten output light guides, while the left channel 42 may only couple to a single large light guide or multi-light guide bundle 44. In the embodiment of FIG. 1b, the focussing lens 45 focusses light from the second reflector portion 18 to the circular mixing rod 28. The focussing lens 45 may be used instead of, or in addition to, either of the fold mirrors 24 and 24a in the right and left channels 30 and 42, respectively, according to design parameters.

A useful feature of the invention, as illustrated in FIG. 1a, is to incorporate two rotating color wheels 46 and 46a at the entrance of the mixing rod 28. The rotating color wheels 46, 46a can be disposed at the exit of the mixing rod 28 or, alternatively, in front of the sector lens 36. With the color wheels 46, 46a at the mixing rod exit, the color of the light to all of the light guides is the same and changes simultaneously as the wheels rotate. With the wheels near the entrance to the sector lens 36, the colors to each light guide are different and can change at different rates depending on the pattern of the wheels. These various color controls are useful in pool lighting, signs, and other applications.

Figure 2:
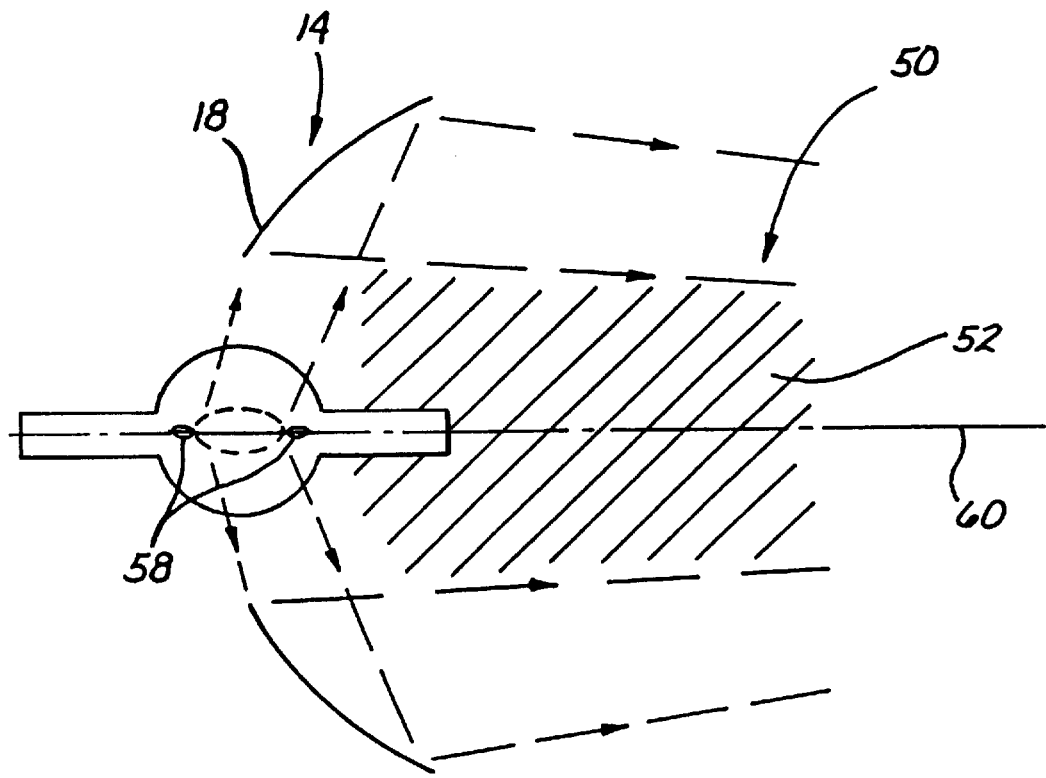
FIG. 2 is an enlarged schematic view of the lamp and right portion of the dual reflector illustrated in FIG. 1.
Figure 3:
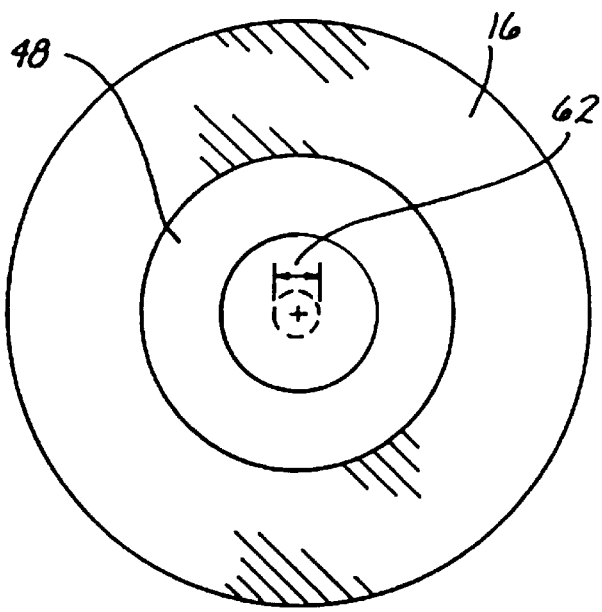
FIG. 3 is an end view of the dual reflector, taken along lines 3—3 in FIG. 1.

The high efficiency of this illumination system derives from the special design of a number of its elements working singly and in combination. The reflector 14 consists of two axially symmetrical curved halves or portions 16 and 18, with the lamp centered at their matching plane. This arrangement makes use of the very efficient collection properties of the low magnification section of the ellipsoidal (or near ellipsoidal) reflector shape. The large hole 48 in the center of each reflector-half (FIG. 3) results in a focussed light beam with a ring-shaped cross section. The light entering the hole in the reflector is not lost but passes into the opposite reflector-half and is focussed into the second focussed beam. This reflector arrangement efficiently generates a ring cross-section beam which is very useful in reducing the radial aperture required of each of the sector lenses 38. FIG. 2 shows a section through the right portion 18 of the dual reflector 14 indicating how the ring-shaped beam 50 is generated. The ring-shaped beam 50, wherein the darkened center portion 52 is represented by cross-hatching, is preserved through the mixing rod 28.

As shown best in FIG. 4, the ring-shaped beam impinges on the sector lens 36 as well, and it can be seen that the outer boundary 54 of the beam 50 and the inner boundary 56 thereof, define the lens aperture in the radial direction. The ring beam thus very usefully limits the required lens aperture and permits lenses of relatively short focal length to be used. This ability to use short focal length lenses permits much more efficient coupling into small diameter light guides, thus unexpectedly increasing the efficiency of the system. The minimum light guide diameter is controlled by the need to match the angular extent of the output beam to the numerical aperture of the light guide.

Another important feature of the invention is the orientation of the light source 12. As illustrated particularly in FIG. 2, the light source 12 is shown at the focal point of the dual reflector 14. The presently preferred embodiment of the light source 12, however, comprises a double-ended lamp, as is discussed below with reference to FIGS. 9–17. Continuing with the general theoretical description of the invention with reference to FIG. 2, the long dimension of the arc discharge of the light source 12, as defined by the position of the electrodes 58, is oriented so as to be substantially parallel and coincident with the reflector symmetry axis 60. The efficiency of transmission of the optical system is greatly influenced by the arc orientation with respect to the reflector because of the high length-to-diameter ratio (typically about five times) of the arc. By aligning the light source 12 as described, the small dimension 62 of the arc (FIG. 3) becomes the controlling parameter in defining the minimum permissible output light guide diameter for efficient coupling. Small output light guide diameter is usually desired in most applications. A design for a small light guide will also, in general, provide efficient coupling to larger light guides provided the numerical aperture of the larger light guide is the same or larger than the smaller light guide. In the presently preferred embodiment, the output light guide core diameter is nominally one half inch. This large diameter may be desired because the high output power of the light source can burn smaller light guides in some cases. Additionally, the sector lens of the present invention, which obviates any need for a focussing lens, has an aspheric shape that can be specified using standard optical equations.

Although six equal lens sectors 38 are illustrated in FIG. 5, the sector lens 36 can have as few as two and up to twelve or more sectors. Also, the sectors need not be equal in area, since in some applications it may be desirable to deliver different amounts of light to different locations. The presently preferred embodiment, which is illustrated in FIGS. 9–17, comprises four equal area sectors. The sector lens as a means of splitting the incident beam has a major advantage over currently used bundled light guides in that the sector lens array separates the light guides from each other (FIGS. 4 and 5), thereby permitting easy installation and removal of individual light guides.

As previously mentioned, the fold reflectors 24, 24a may serve a multiple function of folding mirror and heat rejecting mirror. As a folding mirror, they may be used with or without a hot light source 12, and provide the ability of rotating the entire output optical system around a mechanical axis 64, as best shown in FIG. 1a. This feature is very useful in allowing great flexibility in positioning the direction in which the light guides emerge from the unit. Independent rotation of the fold mirrors 24 and 24a on either side of the light source 12 provides additional flexibility of output light guide location.

As described above, the circular light pipe 28 (as well as light pipe 28a) is used to integrate the angular distribution of the light around the rod axis 66. This is advantageous since it allows the light output of each light guide to be identical (which is usually desired), because the angular light distribution from the light source 12 is not generally uniform. Additionally, the light source 12 will often have some color differences in the angular distribution which also needs to be integrated out in order to avoid undesirable color differences in output between light guides.

Mechanically, the field lens portion 32 of the mixing rod is larger in diameter than the rod section itself in order to provide a loss-free means of mounting the mixing rod 28. Anything touching the mixing rod surface will bleed off some of the internally reflected light unless the rod is clad, which is a disadvantageous approach since it reduces its numerical aperture and increases its cost. Each mixing rod may be coated with a low-index material according to one embodiment of the present invention.

The field lens portion 32 in conjunction with each individual lens sector 38 comprises a relay lens system that roughly images the output end of the mixing rod onto the light guide port. The lens sectors may have aspheric shapes to reduce aberrations and improve efficiency, and are preferably given a thickness such that the output beam is focussed on the rear surface of the lens sector. This allows the soft core of the usual type of light guide to "wet" the lens surface, thereby reducing reflection losses at this interface. In another embodiment of the present invention, air gaps can be maintained between the light guides 40 and the lens sector 38 surfaces.

Figure 6:
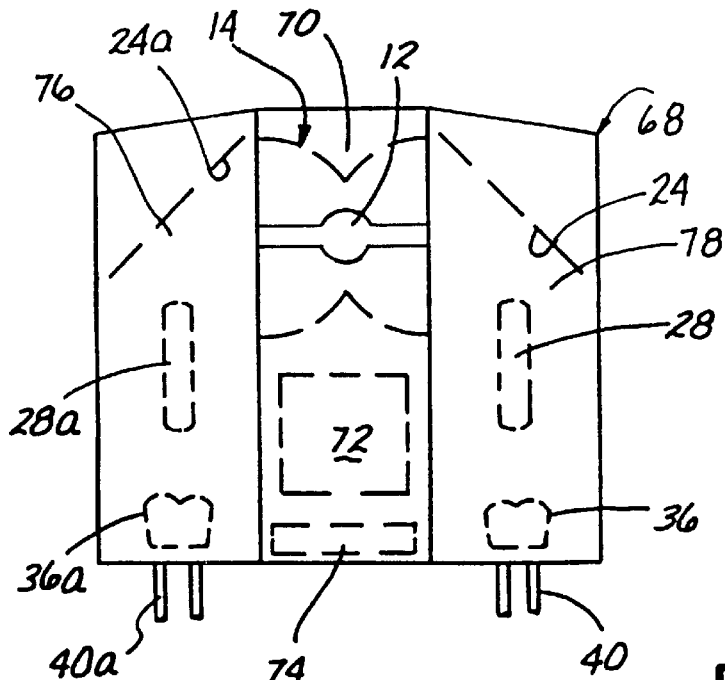
FIG. 6 is a schematic top view of an inventive light guide illumination unit, illustrating a housing containing the system elements shown in FIG. 1.
Figure 7:
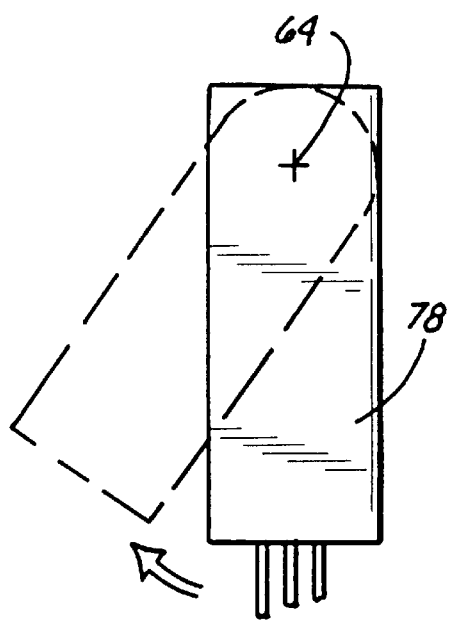
FIG. 7 is a schematic side view of the unit illustrated in FIG. 6.
Figure 8:
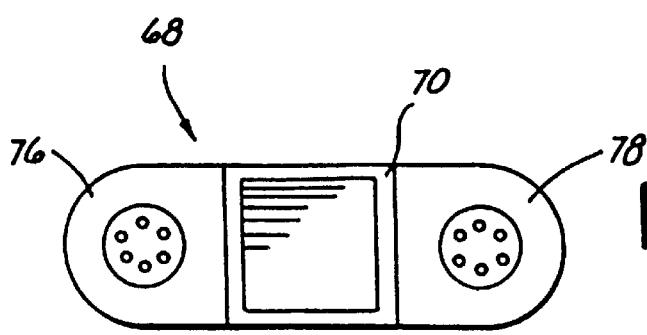
FIG. 8 is a schematic front view of the unit illustrated in FIGS. 6 and 7.

An exemplary complete light guide illumination unit 68 having a modular dual-port construction, is illustrated schematically in FIGS. 6 through 8. The center module 70 of the unit contains the light source 12 and its dual reflector 14, together with a power supply 72, cooling fan 74, and all other associated electrical wiring, etc. Two side modules 76 and 78 preferably contain the fold mirrors 24 and 24a, the mixing rods 28 and 28a, and the collimating lens 34 and 34a and sector lens assemblies 36 and 36a that feed into the light guides 40 and 40a. As discussed in connection with FIG. 1a, although the two modules 76 and 78 are substantially identical, there is no requirement that they be so. Having different sector lenses on either side allows coupling to a different number of light guides on the two sides. Advantageously, the side modules 76 and 78 do not contain any electrical wiring and therefore can be detached easily from the center source module 70, using ordinary mechanical fasteners. The side modules can be rotated about the mechanical axis 64, as discussed in connection with FIG. 1 and shown in FIG. 7, in order to allow convenient placement of the light guide output ports. This feature permits great flexibility for lighting installations with tight space restraints, in building utility closets and the like.

Figure 9A:
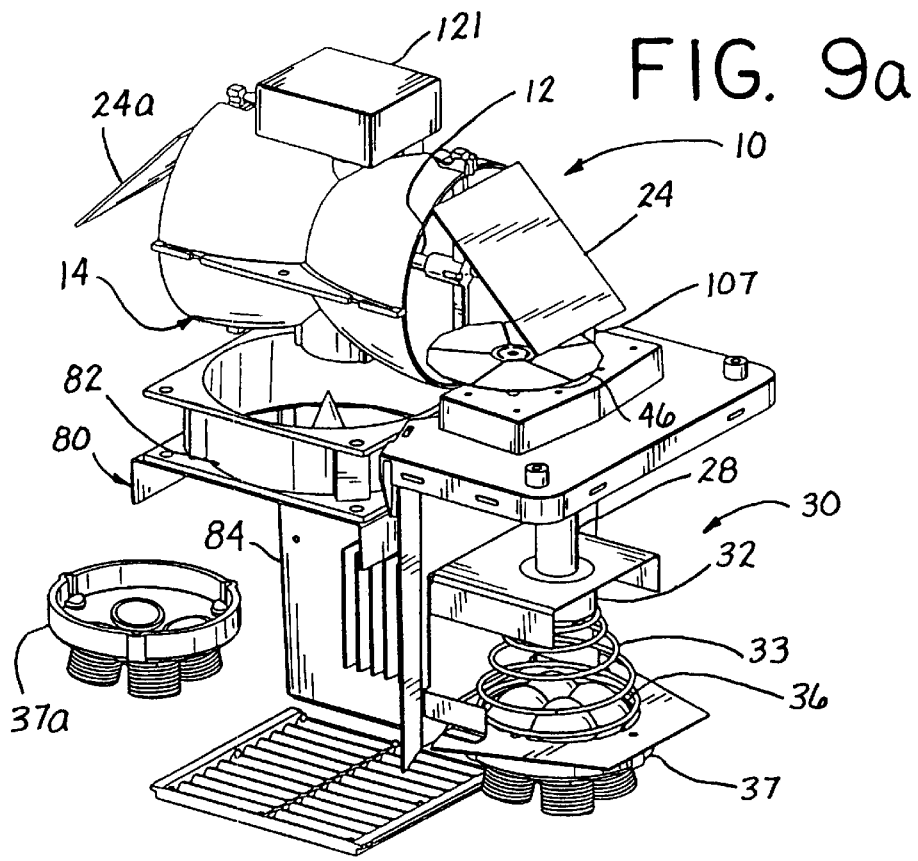
FIGS. 9a and 9b are perspective views of the optical assembly 10 in a partially disassembled state, according to the presently preferred embodiment.
Figure 9B:
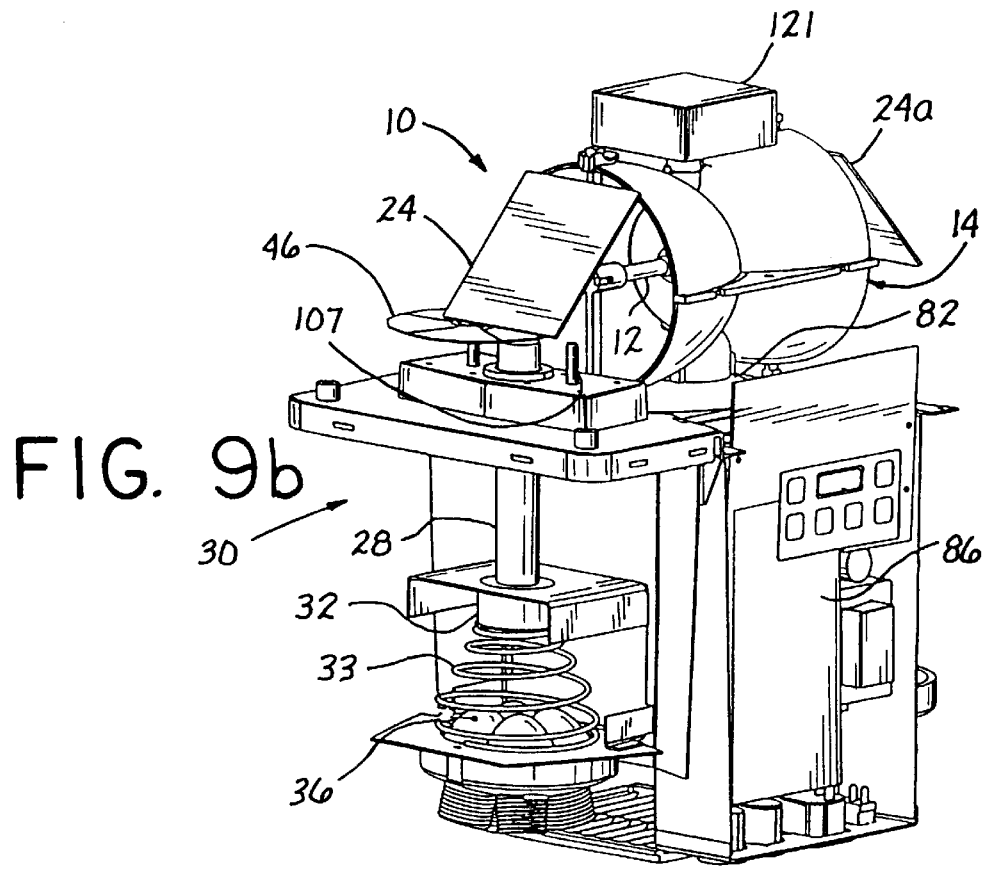

FIGS. 9a and 9b illustrate two perspective views of the optical system 10, in a partially disassembled state, according to the presently preferred embodiment. The optical system 10 comprises a fan and power assembly 80. The fan and power assembly 80 comprises a fan housing and a power supply 84. The fan housing 82 and the power supply 84 are preferably assembled into a single unit, and then secured within the center module 70. The right channel optical assembly 30 is shown in an assembled state, comprising a fold mirror 24, at least one color wheel 46, a light pipe 28, a lens face 32, a spring 33, a multi-sectored lens 36, and a ferrule housing assembly 37.

Although the left channel optical assembly was illustrated in FIG. 1, comprising a lens end 26a, a light pipe 28a and a multi-light guide bundle 44, the left channel optical assembly 42 may be configured similarly to the right channel optical assembly 30 shown in FIG. 9a. For example, the left channel optical assembly 42 in FIG. 9a may comprise optical components similar to those of the right channel optical assembly 30 of FIG. 9a, disposed between the fold mirror 24a and the ferrule housing assembly 37a. As presently embodied, each of the left channel optical assembly and the right channel optical assembly comprises an optical assembly, which may be secured together, before placement within the corresponding side module 76, 78. In addition to a preassembled fan and power assembly 80, and preassembled optical assemblies 30, 42, the presently preferred embodiment further comprises an electrical assembly 86. The electrical assembly 86 is illustrated in FIG. 9b in an assembled state, secured to the optical system 10.

Figure 10:
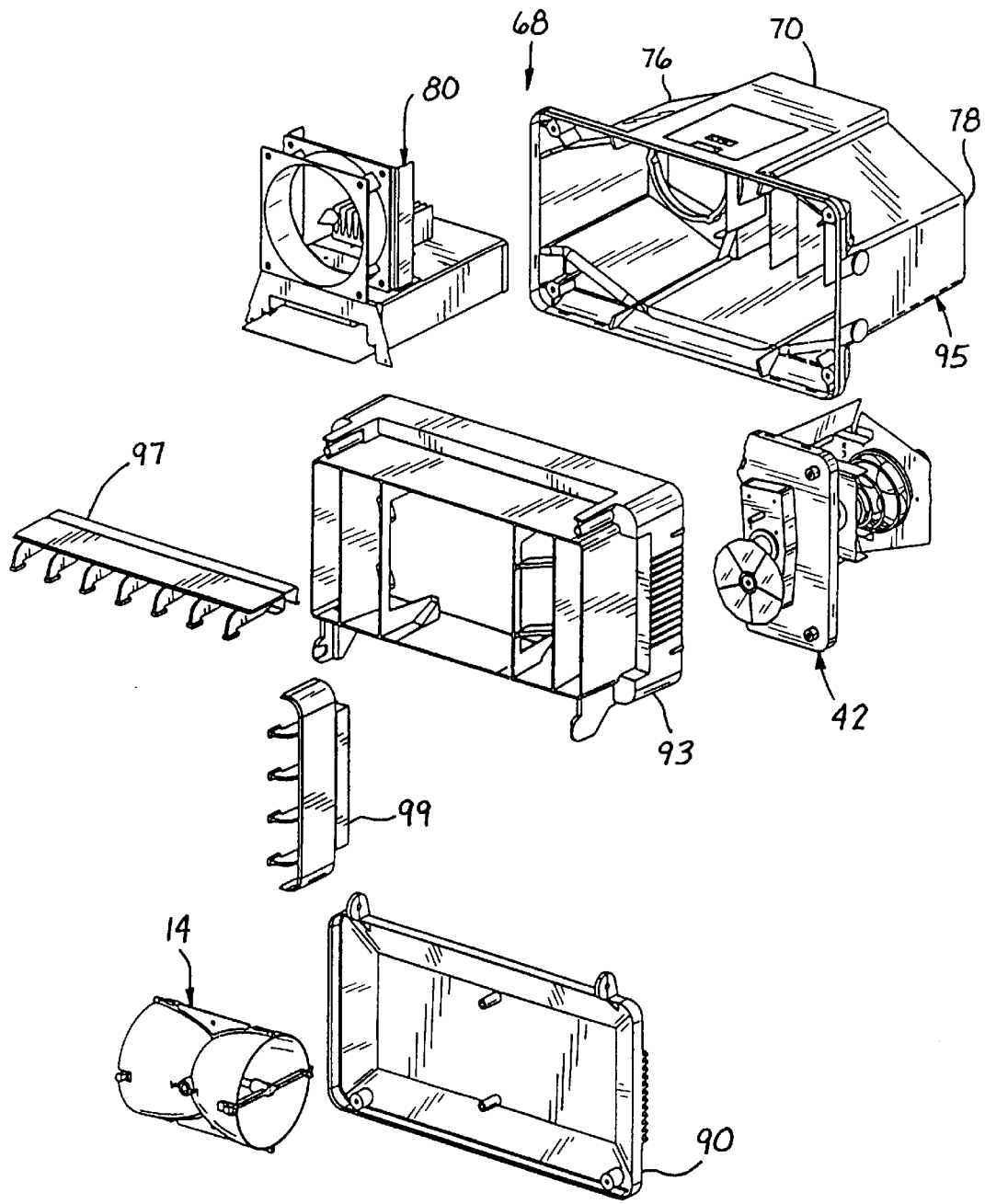
FIG. 10 illustrates an exploded view of the light guide illumination unit, according to the presently preferred embodiment.

FIG. 10 illustrates an exploded view of the optical system 10, which may comprise the left channel optical assembly 42, the fan and power assembly 80, the dual-curved reflector 14, a rear housing 90, an intermediate housing 93, a front housing 95, a top shield 97, and a left shield 99. The disassembled illustration of FIG. 10 does not show the right channel optical assembly 30, the bottom shield, and the right shield.

FIG. 11a discloses the right channel optical assembly 30 in a partially disassembled configuration. A color wheel nut assembly 105 secures the color wheel 46 to a color wheel shaft, which is driven by a motor. FIGS. 11b and 11c disclose perspective views of the right channel optical assembly 30. As can be seen from FIG. 11b, for example, an additional color wheel may be secured onto the color wheel shaft 107 with a color wheel nut assembly (not shown), which is similar to the color wheel nut assembly 105.

The color wheels are adapted for use in either the first side module 76, the second side module 78, or both. As presently embodied, the use of the first color wheel 46 and a second color wheel (not shown) provides a number of special functions. The two color wheels are preferably used together to allow for a total of ten cells for placement of color filters. Accordingly, more colors are available with use of both of the color wheels. The two color wheels overlap in front of the mixing rod 28, for example. One of the color filters is preferably an aluminum shutter, which alternates the passage of light therethrough. The shutter can be adjusted over the light beam to provide dimming, for example. The two color wheels together allow for mixing of colors.

The spring 33 is positioned between the multi-sectored lens 36 and the lens face 32. The spring 33 pushes against the multi-sectored lens 36 and the lens face 32. These lenses 32 and 36 may have grooves cut into them so they can interface with the spring 33 and fit into a round cut-out in the sheet metal. By pressing on the lenses as shown in FIG. 11a, for example, the lenses 32 and 36 are retained in the metal base without any screws or adhesive.

FIG. 12a illustrates a perspective view of the dual-curved reflector 14 and a partially disassembled view of the light source 12, according to the presently preferred embodiment. As presently embodied, the light source 12 comprises a metal halide lamp, model BA 575 GS, which is manufactured by Sylvania. This metal halide lamp preferably comprises a 575 watt lamp, which is adapted for emitting approximately 49,000 lumens at a color temperature of between 4,000 and 6,000 degrees Kelvin. As can be seen from FIG. 12a, for example, the metal halide lamp comprises a first end 111 and a second end 113. A first electrode 115 and a second electrode 117 feed from opposite ends of the metal halide lamp 12.

The metal halide lamp 12 provides a greater distribution of illumination within the dual-curved reflector 14, and allows for more efficient operation. An ignitor 121 (FIG. 9) is used to drive the metal halide lamp 12. As presently embodied, the dual-curved reflector 14 is cast molded. The dual-curved reflector 14 also preferably comprises reflective metal inserts (not shown). It may also be made of molded glass with a metal support structure (not shown). The dual-curved reflector 14 is illustrated comprising two mounting webs 123 and 125. Each of the mounting webs 123, 125 comprises a mounting aperture 127, 129, respectively. Mounting brackets 132 and 133 comprise cups 135 and 137, respectively. A first cup 135 accommodates a first electrode 115 and the first end 111, and a second cup 137 accommodates the second electrode 117 and the second end 113. The brackets 132 and 133 preferably comprise ceramic. Plastic may also be used, but sufficient ventilation must be maintained to control the temperature within the optical system 10 in this embodiment. If the optical system 10 is used outdoors and is covered with leaves, for example, sufficient ventilation may be prevented by the accumulation of leaves over exterior vents of the optical system 10. In such a case, the brackets 132 and 133, if made of plastic, may become deformed from excessive heat. The holding of the illumination source 12 by the two brackets 132 and 133 has been found to be advantageous over prior art illumination source brackets. The two brackets 132 and 133 are adapted to be secured to the large-diameter, circular distal ends of the dual reflector. This securing to the distal ends of the dual reflector, as distinguished from prior art brackets which are secured to proximal or middle ends of the dual reflector, does not interrupt the interior reflective surfaces of the dual reflector where the intensity of light is the greatest. Thus, the brackets 132 and 133 of the present invention facilitate greater reflection of light from the illumination source out of the reflector, since the interior reflective surfaces closest to the illumination source are not used to hold the illumination source.

The central mount 140 is adapted for accommodating a conventional light source 12, which may comprise an arc lamp, for example. Clips 142 fit onto opposing ends of the brackets 132, 133, and also fit into recesses 144 within the dual-curved reflector 14, to thereby secure the light source 12 within the dual-curved reflector 14. FIGS. 12b and 12c illustrate perspective views of the dual-curved reflector 14 with the light source 12 secured therein.

FIGS. 13a–13d illustrate various views of the light source 12 and mounting brackets 132, 133. As presently embodied, a cylindrical metal insert (not shown) is inserted within the cup 135, and another cylindrical cap 146 in inserted within the metal insert. The metal insert may be glued to the cup 135 and the cap 146. As presently preferred, the metal insert is spring loaded between the cup 135 and the cap 146. As shown in the cross-sectional view of FIG. 13c, the first illuminated end 111 comprises a diameter which is substantially smaller than an inner diameter of the cup 135. This difference in diameter provides a space for accommodating the cap 146 and the optional metal insert, which is preferably spring loaded. Other means for securing the light source 12 between the two mounting brackets 132, 133, however, may be implemented within the scope of the present invention.

Figure 14A:
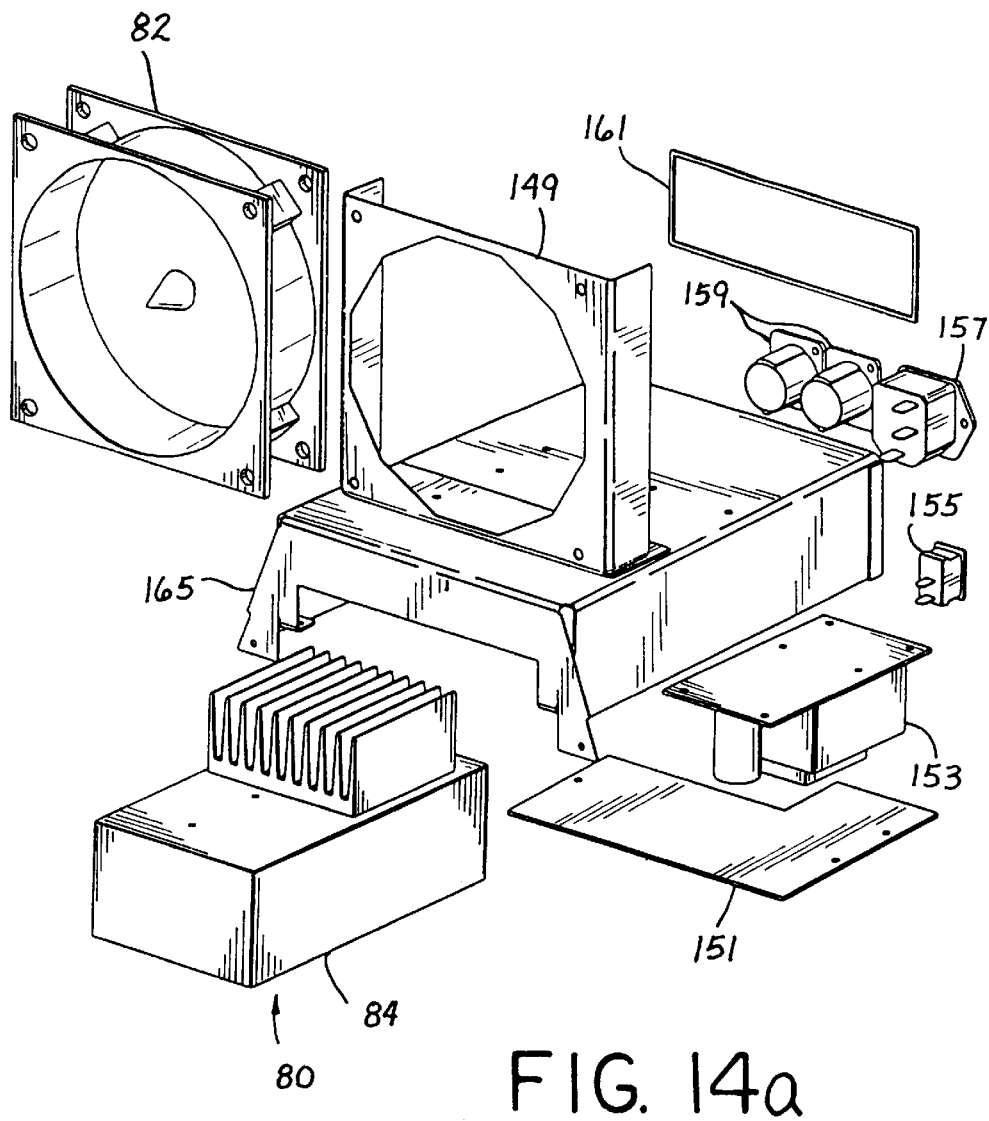
FIG. 14a illustrates a partially disassembled view of the fan and electrical assembly of the center source module, according to the presently preferred embodiment.
Figure 14B:
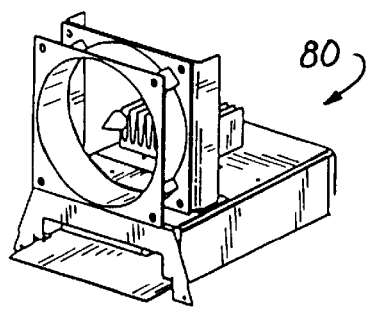
FIGS. 14b and 14c illustrate perspective views of the fan and power assembly shown in FIG. 14a, according to the presently preferred embodiment.
Figure 14C:
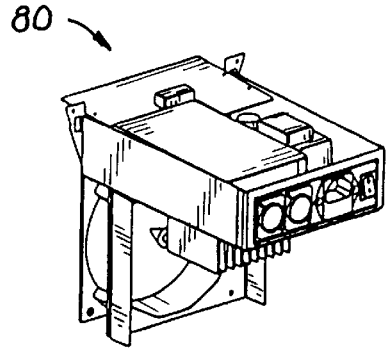

FIGS. 14a–14c illustrate various views of the fan and power assembly 80, which is preferably preassembled before being secured within the central source module 70. The fan and power assembly 80 comprises the fan housing 82, the power supply 84, a fan mount bracket 149, and a number of electrical components. More particularly, a DMX card and PCA display 151, transformer 153, power switch 155, power entry module 157, DMX connectors 159 and moisture seal 161 are all additionally assembled onto a frame member 165 of the fan and power assembly 80.

Figure 17B:
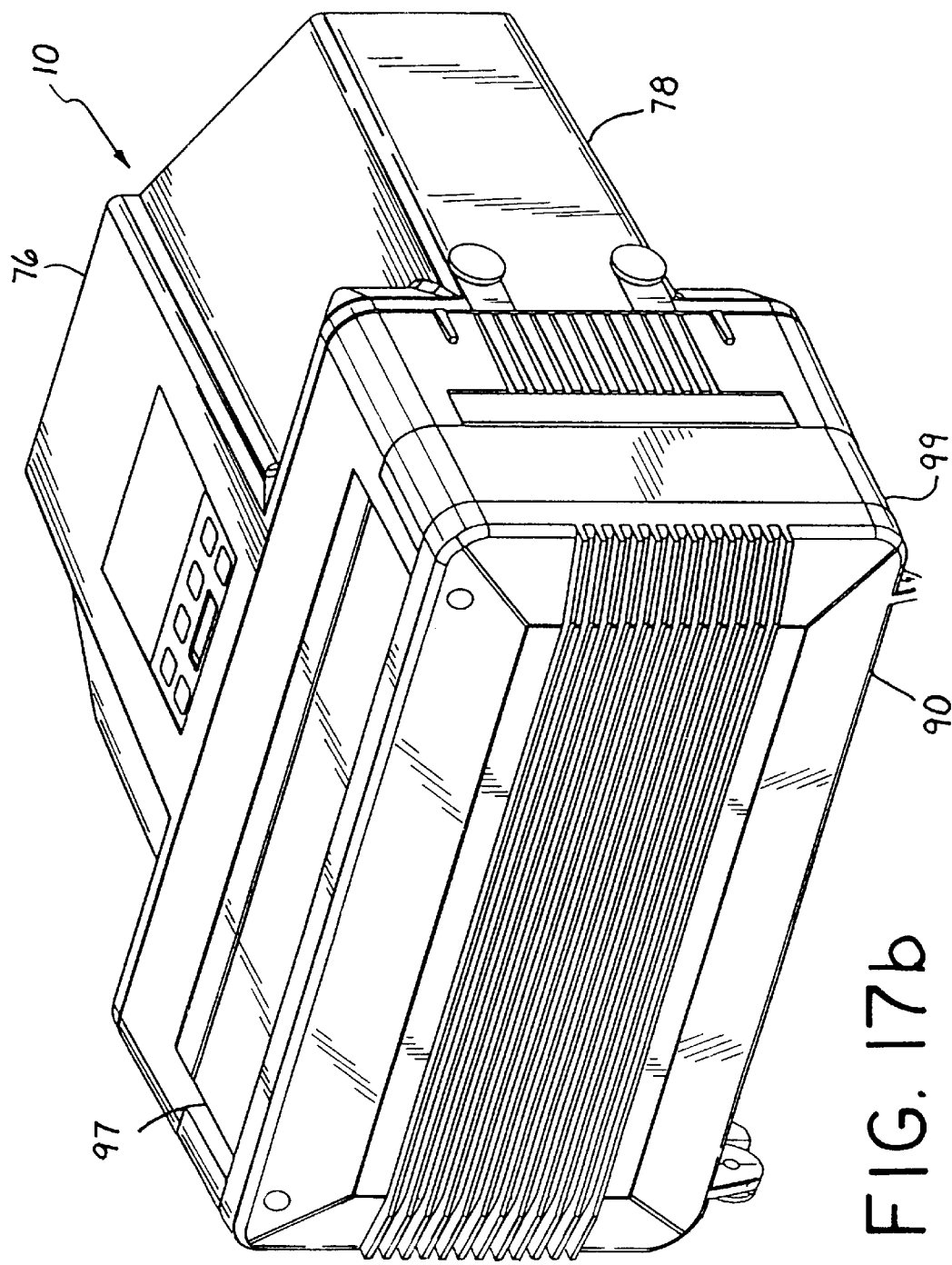

FIGS. 15a–15c illustrate various views of the top shield 97, and FIGS. 16a–16c illustrate various views of the left shield 99. The bottom shield (not shown) and right shield (not shown) are preferably configured similarly to the top shield 97 and the left shield 99, respectively. As shown in FIG. 15a, for example, the shield 97 comprises a shield portion 170 and a screen portion 172. Similarly, the left shield 99 preferably comprises a shield portion 178 and a screen portion 180. FIGS. 17a and 17b illustrate perspective views of the optical system 10 in an assembled configuration.

Although exemplary embodiments of the invention have been shown and described, many other changes, modifications and substitutions, in addition to those set forth in the above paragraphs, may be made by one having ordinary skill in the art without necessarily departing from the spirit and scope of this invention.

What is claimed is:

1. A light guide illumination system, comprising:

a double-ended illumination source adapted to emit light, the double-ended illumination source having a first electrode disposed at a first end of the illumination source and a second electrode disposed at a second end of the illumination source, for feeding electrical power to the illumination source from both ends thereof;

a dual-curved reflector disposed in proximity to the double-ended illumination source, the dual reflector being adapted to reflect the emitted light from the double-ended illumination source to at least one output light guide disposed downstream of said dual-curved reflector;

a first mounting bracket disposed at a first light-emitting end of said dual-curved reflector, for accommodating the first end of the illumination source; and a second mounting bracket disposed at a second light-emitting end of said dual-curved reflector, for accommodating the second end of the illumination source.

2. The light guide illumination system as recited in claim 1, and further comprising a central mount disposed between said first and second mounting brackets on said dual-curved reflector, for accommodating a conventional illumination source.

3. The light guide illumination system as recited in claim 1, and further comprising a plurality of clips for attaching said first and second mounting brackets to said dual-curved reflector.

4. The light guide illumination system as recited in claim 3, wherein said dual-curved reflector further comprises a first pair of opposing notches which are disposed on said first light-emitting end, and a second pair of opposing notches which are disposed on said second light-emitting end, each of said notches receiving one of said clips for attaching an end of a corresponding one of said mounting brackets thereto.

5. The light guide illumination system as recited in claim 1, wherein said mounting brackets are comprised of a ceramic material.

6. The light guide illumination system as recited in claim 1, wherein said mounting brackets are comprised of a plastic material.

7. The light guide illumination system as recited in claim 1, wherein the double-ended illumination source comprises a metal-halide lamp.

8. The light guide illumination system as recited in claim 1, and further comprising a multi-sectored lens, the multi-sectored lens being disposed to receive reflected light from the dual-curved reflector and to focus the light into the at least one output light guide.

9. The light guide illumination system as recited in claim 1, wherein the dual-curved reflector comprises two curved surfaces which are disposed in a back-to-back fashion, each of the two curved surfaces comprising an aperture disposed at a center of the curved surface.

10. The light guide illumination system as recited in claim 1, wherein said first and second mounting brackets each comprise an arm having a length and further comprise a cup disposed along the length of said arm, said cup being adapted to receive one of said first and second electrodes and one of the first and second ends of said illumination source.

11. The light guide illumination system as recited in claim 10, and further comprising a spring-biased insert in each of said cups, for securing said illumination source between said first and second mounting brackets.

12. A light guide illumination system, comprising:

a dual-curved reflector disposed in proximity to a double-ended illumination source, the dual reflector being adapted to reflect the emitted light from the double-ended illumination source to at least one output light guide disposed downstream of said dual-curved reflector, the dual-curved reflector comprising two curved surfaces which are disposed in a back-to-back fashion, each of the two curved surfaces comprising an aperture disposed at a center of the curved surface;

a double-ended illumination source adapted to emit light, the double-ended illumination source having a first electrode disposed at a first end of the illumination source and a second electrode disposed at a second end of the illumination source, for feeding electrical power to the illumination source from both ends thereof, the illumination source being disposed at the centers of the two curved surfaces;

a first mounting bracket disposed at a first light-emitting end of said dual-curved reflector, for accommodating the first end of the illumination source; and a second mounting bracket disposed at a second light-emitting end of said dual-curved reflector, for accommodating the second end of the illumination source.

13. The light guide illumination system as recited in claim 12, and further comprising a central mount disposed between said first and second mounting brackets on said dual-curved reflector, for accommodating a conventional illumination source.

14. The light guide illumination system as recited in claim 12, and further comprising a plurality of clips for attaching said first and second mounting brackets to said dual-curved reflector.

15. The light guide illumination system as recited in claim 14, wherein said dual-curved reflector further comprises a first pair of opposing notches which are disposed on said first light-emitting end, and a second pair of opposing notches which are disposed on said second light-emitting end, each of said notches receiving one of said clips for attaching an end of a corresponding one of said mounting brackets thereto.

16. An illumination source support system for mounting a double-ended illumination source on a dual-curved reflector, the dual-curved reflector having a center portion adapted to receive the illumination source in close proximity thereto and two distal ends where light from the illumination source can exit the dual-curved reflector, the support system comprising:

a mounting bracket comprising an arm disposed at one of said distal ends and being attached thereto, said mounting bracket being fabricated of a non-electrically conductive material and being adapted to extend diametrically across said at least one distal end.

17. The support system as recited in claim 16, wherein said material comprises a ceramic.

18. The support system as recited in claim 16, wherein said mounting bracket further comprises a cup disposed along the length of said arm, said cup being adapted to receive one of the first and second ends of said illumination source.

19. The light guide illumination system as recited in claim 18, and further comprising a spring-biased insert in said cup.

* * * * *